Dec. 15, 1964   G. A. BRENNAN ETAL   3,161,418
VEHICULAR WHEEL ASSEMBLY
Filed March 4, 1963   2 Sheets-Sheet 1
FIG. 1.
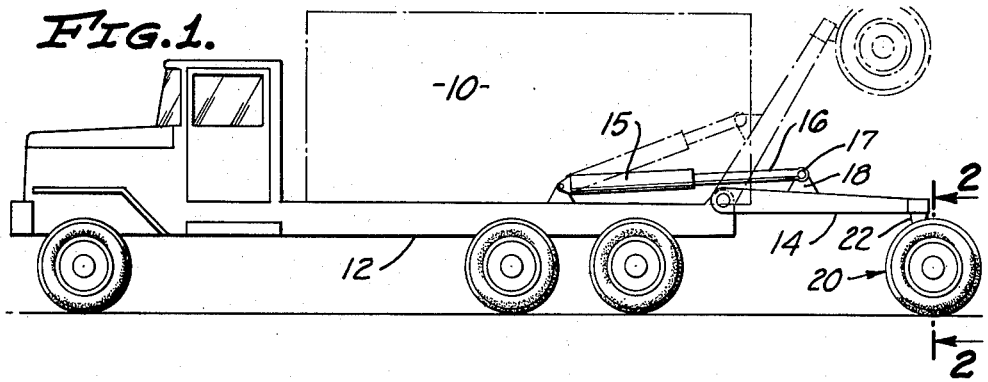
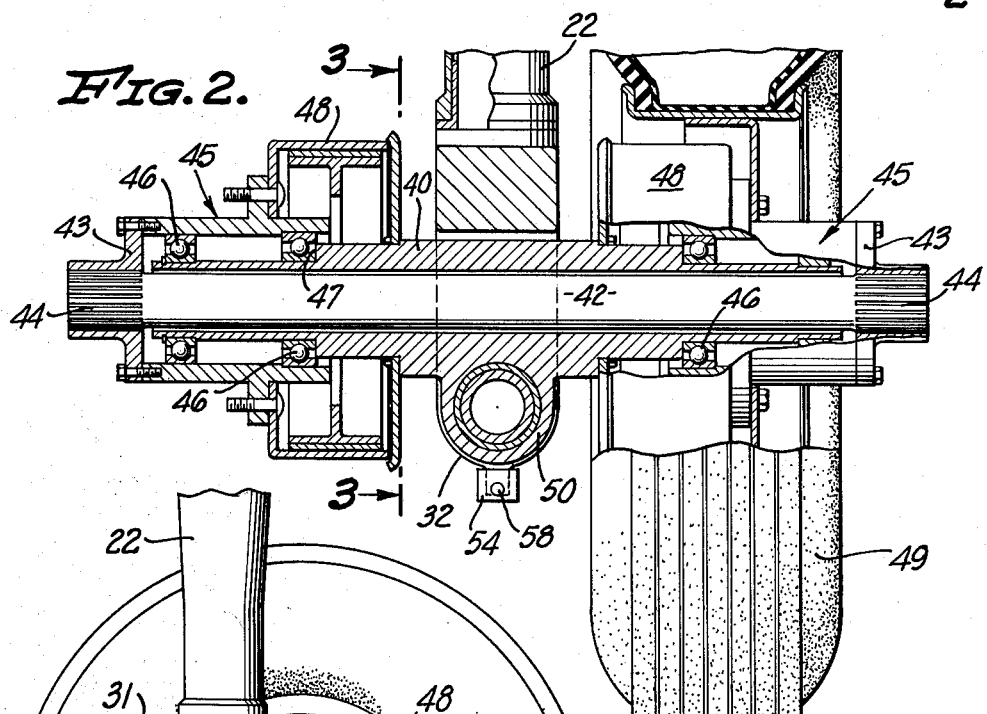
FIG. 2.
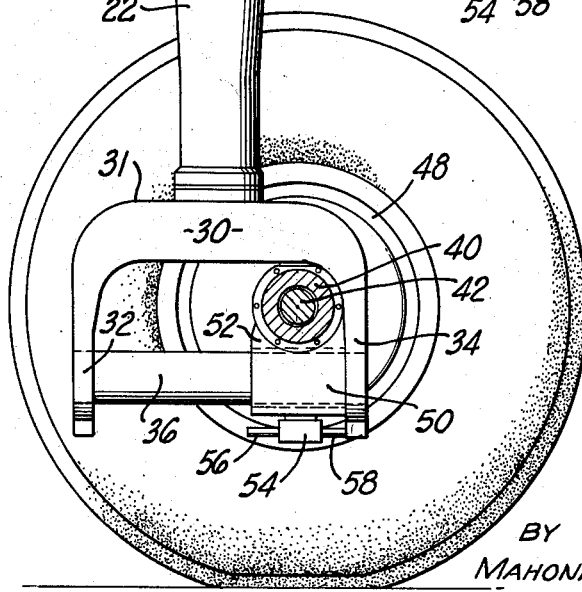
FIG. 3.
INVENTORS
GEORGE A. BRENNAN,
EVAN S. PRICHARD
BY MAHONEY, HALBERT & HORNBAKER
ATTORNEYS Dec. 15, 1964   G. A. BRENNAN ETAL   3,161,418
VEHICULAR WHEEL ASSEMBLY
Filed March 4, 1963   2 Sheets-Sheet 2
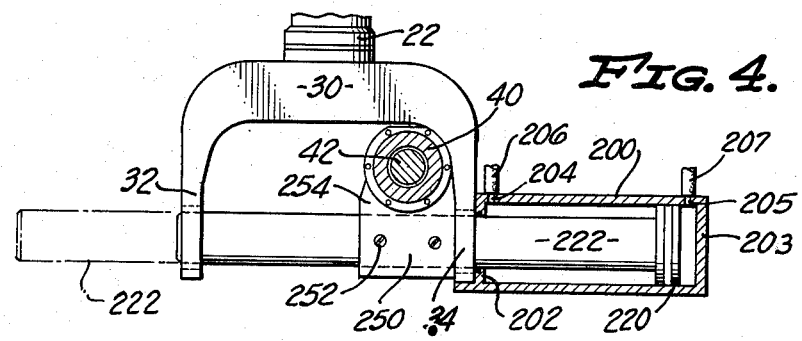
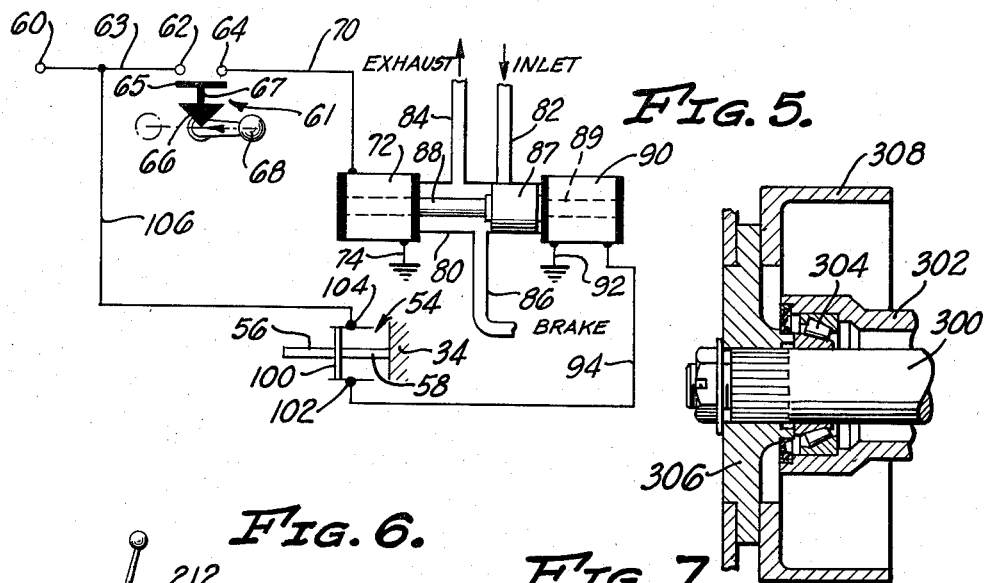
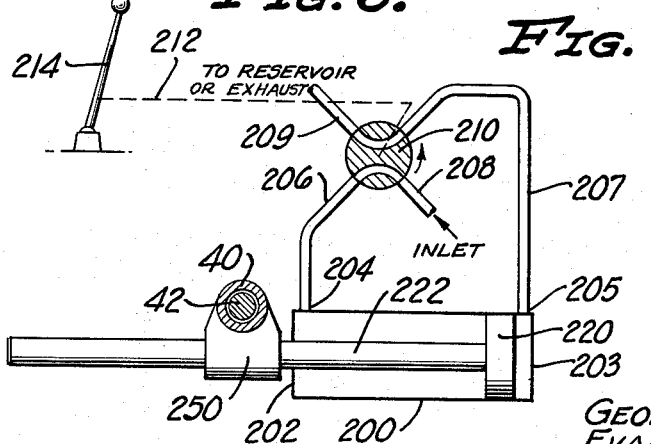
INVENTORS
GEORGE A. BRENNAN,
EVAN S. PRICHARD
BY
MAHONEY, HALBERT & HORNBAKER
ATTORNEYS

United States Patent Office 3,161,418
Patented Dec. 15, 1964

3,161,418
VEHICULAR WHEEL ASSEMBLY
George A. Brennan, La Mirada, and Evan S. Prichard, Newport Beach, Calif., assignors to Challenge-Cook Bros., Incorporated, Los Angeles, Calif., a corporation of California
Filed Mar. 4, 1963, Ser. No. 262,688
6 Claims. (Cl. 280—81)

This invention relates to a vehicular wheel assembly, and the invention is particularly applicable to a ground-contacting wheel assembly of the caster type used to support a trailing vehicle such as that described in application Serial No. 199,090 on a Truck-Trailer Transit Mixer, filed May 31, 1962, now Patent No. 3,112,100, and in application Serial No. 224,419 on a Load-Carrying Vehicle, filed September 18, 1962, all of common ownership.

The wheels of trailing vehicles, particularly if they are of the caster type, are prone to wobble, especially when the main vehicle is driven forward at substantial speeds. The inherent disadvantages and dangers of wobble in the trailing vehicle are obvious.

It is an object of the present invention to provide a wheel assembly for a trailing vehicle which will effectively prevent wheel wobble.

Additionally, if a caster type wheel assembly is mounted on a trailing vehicle in fixed relation to the trailing vehicle along the vertical axis of a king pin, difficulties will be encountered if and when the driving direction of the main vehicle, to which the trailing vehicle is appurtenant, is reversed, particularly if weight-load distributing means are provided to bear on the trailing vehicle and to transfer a portion of the weight-load from the axles of the main vehicle to the axles of the trailing vehicle. Under such circumstances, direct downward thrust of the weight on the axle of the wheel assembly of the trailing vehicle may cause the ground-contacting wheels to bind and resist rearward movement.

It is therefore a further object of the invention to provide a wheel assembly for a trailing vehicle which is readily adjustable as to position so that the wheel assembly is in one position out of the axis of the king pin when the main vehicle and appurtenant trailing vehicle are moving forward, and in another position out of the axis of the king pin when the main vehicle and trailing vehicle are moving in reverse.

With these and other objects in view, the invention consists of the constructions, arrangements and combinations of the various elements of the device whereby the objects contemplated are attained, as hereinafter set forth, pointed out in the appended claims, and illustrated in the accompanying drawings.

FIG. 1 is a side elevational view of a truck with a wheel trailing vehicle, and showing the wheel assembly of the present invention in its forward motion position;

FIG. 2 is an enlarged sectional view, partly cut away, taken on line 2—2 of FIG. 1, and showing a full-floating axle assembly;

FIG. 3 is a view taken on line 3—3 of FIG. 2;

FIG. 4 is a view similar to FIG. 3, but showing an alternative form of the wheel assembly of the present invention (for ease of illustration, no wheel being depicted, and the king pin being broken away);

FIG. 5 is a schematic diagram showing the controls for the form of the invention illustrated in FIGS. 2 and 3 of the drawings;

FIG. 6 is a schematic diagram showing the controls for the alternative form of the invention illustrated in FIG. 4 of the drawings; and FIG. 7 is a view similar to a portion of FIG. 2, but showing details of an alternative form of axle assembly.

As illustrated in FIG. 1 of the drawings, a truck, generally designated as 10, has a body frame 12, to the rear end of which a framed trailing vehicle 14 is pivotally mounted. A hydraulic cylinder 15 is pivotally mounted on the body frame 12 of the truck 10, and a piston rod 16 protrudes rearwardly from the cylinder 15, said piston rod 16 having its free end 17 pivotally connected to the trailing vehicle 14, as by a trunnion 18 mounted on the trailing vehicle 14, the cylinder 15 and the piston rod 16 being disposed so that downward pressure may be applied from the truck 10 to the trailing vehicle 14 when weight-load distribution to the trailing vehicle 14 is to be accomplished, and so that the trailing vehicle 14 may be elevated to the position shown in phantom lines in FIG. 1 when desired.

The trailing vehicle 14 has a ground-contacting wheel assembly, generally designated as 20. The wheel assembly 20 is preferably mounted adjacent the rear end of the trailing vehicle 14, and is mounted on a vertical strut or king pin 22 depending from the trailing vehicle 14, said strut or pin 22 being pivotally mounted on the trailing vehicle 14.

As best illustrated in FIG. 3 of the drawings, a yoke 30 is mounted on the lower end of the king pin 22, said yoke 30 having a body portion 31, the mounting of the yoke 30 on the pin 22 being preferably substantially at the center of the body portion 31, said yoke 30 has a downwardly disposed open end 32 and a downwardly disposed open end 34, said open ends 32 and 34 being generally fore and aft respectively when the trailing vehicle 14 is in forward or rear transit position.

A transverse rod 36 is mounted between the open ends 32 and 34 of the yoke 30. The transverse rod 36 is spaced apart from the body 31 of the yoke 30, and the extremities of the open ends 32 and 34 extend beyond the rod 36.

In the form of the invention illustrated in FIG. 2 of the drawings, a hollow tubular axle 40 is disposed between the body 31 of the yoke 30 and the rod 36. A full-floating axle 42 is in turn disposed within the hollow tubular axle 40. The ends of the axle 42 protrude beyond the ends of the tubular axle 40, and wheel hub caps 43 are firmly mounted on the protruding ends of the axle 42 by any suitable means, such as by the splines 44 illustrated in FIG. 2 of the drawings.

The caps 43 are in turn mounted on wheel hub assemblies which are generally designated 45, the wheel hub assemblies 45 being in turn mounted for rotation on the tubular axle 40 by bearings 46. Shoulders 47 are formed in the tubular axle 40 to position the wheel hub assemblies 45. Fluid pressure brakes 48 form a part of the wheel hub assemblies 45. Tires 49 are mounted on the wheel hub assemblies 45.

A collar 50 is slidably mounted on the rod 36. The collar 50 has an upwardly extending arm 52 which is mounted on the tubular axle 40 at the center of the tubular axle 40, the tubular axle 40 being thus firmly mounted on the collar 50, with the collar 50 supporting the wheel assembly 20 on the rod 36.

An electric switch 54 is mounted on and suspended from the collar 50. A first plunger rod 56 is mounted on the switch 54, said rod 56 projecting forwardly of the switch 54 and being disposed so as to strike the extremity of the open end 32 of the yoke 30 and thus activate the switch 54 in the manner hereinafter described. A second plunger rod 58 is mounted on the switch 54, said rod 58 projecting rearwardly of the switch 54 and being disposed so as to strike the extremity of the open end 34 of the yoke 30 and thus activate the switch 54, also in the manner hereinafter described.

Referring to FIG. 5 of the drawings, the electrical system for operating the first form of the device of the present invention is connected to a source of electric energy, such as a truck battery 60. A normally open switch, generally designated as 61, has one pole 62 which is connected to the battery 60 by the line 63. The switch 61 has a second pole 64. The switch 61 has a contact bar 65 disposed so as to make contact between the poles 62 and 64. A strike plate 66 is mounted on the contact bar 65 by any suitable means, such as by a rod 67. Strike plate 66 is disposed in the path of a gear shift lever 68 so that, upon shifting of the truck gears to forward drive or to reverse drive, the gear shift lever will strike the strike plate 66, and the strike plate 66 will move the contact bar momentarily into contact with the poles 62 and 64 to close the switch 61.

A line 70 leads from the pole 64 of the switch 61 to a solenoid 72. A ground 74 is provided for the solenoid 72.

The solenoid 72 is mounted at one end of a hydraulic slide valve 80. A hydraulic fluid inlet conduit 82 leading from the hydraulic braking system of the truck 10 is mounted on the slide valve 80 and provides fluid access to the slide valve 80. A hydraulic fluid exhaust conduit 84 leading to the braking system of the truck 10 is also mounted on the slide valve 80 intermediate the conduit 82 and the solenoid 72. Said conduit 84 provides fluid egress from the slide valve 80. A third hydraulic fluid conduit 86 is mounted on the slide valve 80 and provides fluid passage to the hydraulic braking system of the wheel assembly 20 of the trailing vehicle 14 (not shown in full detail).

A piston 87 is slidably disposed in the slide valve 80, and a piston rod 88 is connected to the piston 87 and extends through the slide valve 80 and into the solenoid 72 so as to be activated by the solenoid 72 to move the piston 87. A second piston rod 89 is connected to the piston 87 and extends through the slide valve 80 and into a second solenoid 90 so as to be activated by the solenoid 90 to move the piston 87. The piston 87 is disposed so as to alternately open and close the conduits 82 and 84 upon reciprocal movement of the piston 87 within the valve 80. The solenoid 90 has a ground connection 92.

An electric line 94 leads from the solenoid 90 to the switch 54, which is normally open. The plunger rods 56 and 58 of the switch 54 are mounted on opposite sides of a contact bar 100, disposed within the switch 54. Plate contacts 102 and 104 are disposed in the switch 54 in spaced relationship to each other so as to make sliding contact with the contact bar 100 upon reciprocal movement of the contact bar 100 within the switch 54 in the manner hereinafter described. The line 94 is connected to the plate contact 102, while an electric line 106 is connected to the plate contact 104 and leads from the plate contact 104 to the line 63, intermediate the battery 60 and the pole 62 of the switch 61.

Because the axle 42 has the wheel hub assemblies 45 mounted thereon so that the axle 42 and the wheel hub assemblies 45 turn as one unit, with the axle 42 fullfloating within the tubular axle 40, while the wheel hub assemblies 45 rotate about the tubular axle 40 on their bearings 46, wobble of the wheel assembly 20 is effectively prevented by the disposition of the axle 42 within the tubular axle 40.

In the operation of the wheel assembly 20 of the trailing vehicle 14 in the first form of the invention, when the truck 10 is proceeding in a forward direction, the collar 50 and the assembly of the axles 40 and 42 will be in the position illustrated in FIG. 3 of the drawings, with the collar 50 abutting on the rearward open end 34 of the yoke 30, and with the axle assembly supported by the collar 50 disposed rearwardly of the axis of the king pin 22. When the truck 10 is stopped, the collar 50 and the axle assembly will remain in that position, at which time the piston 87 will be disposed in the valve 80 so as to block fluid passage from the inlet conduit 82, as illustrated in FIG. 5 of the drawings, and thus no braking is applied at this time to the wheel assembly 20.

When the truck is to be reversed, the driver of the truck shifts the gear lever 68 into reverse gear position, during the course of which shifting the gear lever 68 will hit the strike plate 66, momentarily closing the switch 61. The electric circuit to the solenoid 72 is thus closed, and the solenoid 72 is energized to draw the piston rod 88 and the piston 87 to the left in the valve 80, thus permitting the passage of hydraulic fluid through the inlet conduit 82 and the valve 80 into the conduit 86, so as to apply the brakes to the wheel assembly 20, while blocking exhaust of the hydraulic fluid through the exhaust conduit 84.

As the truck 10 and the trailing vehicle 14 reverse, the wheel assembly 20 being braked, the rod 36 will slide through the collar 50, until the end 32 of the yoke 30 strikes the plunger rod 56 of the switch 54, depressing the plunger rod 56 and causing the contact bar 100 to slidably contact the plate contacts 102 and 104, thus momentarily closing the electric circuit to the solenoid 90, which is then energized to draw the piston rod 88 and the piston 87 to the right in the valve 80, thus blocking the flow of hydraulic fluid from the inlet conduit 82 and open the exhaust conduit 84, releasing the braking action on the wheel assembly 20. At this time, the collar 50 will be abutting on the forward open end 32 of the yoke 30, and the axle assembly supported by the collar 50 will be disposed forwardly of the axis of the king pin 22.

When reverse movement of the truck 10 and the trailing vehicle 14 ceases and they are to be driven forward, the gear lever 68 is shifted into a forward gear position, again hitting the strike plate 66 and momentarily closing the switch 61. The closed electric circuit to the solenoid 72 then energizes the solenoid 72, and the operation of the slide valve 80 is repeated, so that the exhaust conduit 84 is blocked and the inlet conduit 82 is opened to permit the flow of the hydraulic fluid into the braking system of the wheel assembly 20. With the brakes applied to the wheel assembly 20, the rod 36 will slide through the collar 50 until the end 34 of the yoke 30 strikes the plunger rod 58. The contact bar 100 then slidably contacts the plate contacts 102 and 104 of the switch 54, momentarily closing the electric circuit to the solenoid 90, which is then energized to repeat the operation of the slide valve 80, opening the exhaust conduit 84 and closing the inlet conduit 82 to release braking on the wheel assembly 20. The collar 50 will then again be abutting on the rearward open end 34 of the yoke 30, and the axle assembly supported by the collar 50 will again be disposed rearwardly of the axis of the king pin 22.

It will thus be seen that when the truck 10 and the trailing vehicle 14 are in motion, either forwardly or rearwardly, the axle assembly of the wheel assembly 20 is disposed either rearwardly or forwardly, respectively, of the axis of the king pin 22, which is bearing the weightload transferred to the trailing vehicle 14 by the cylinder 15 and the piston rod 16, so that the weight-load is borne indirectly, rather than directly, by the axle assembly. Consequently, binding of the wheel assembly 20 is prevented.

The momentary braking of the wheel assembly 20 hereinabove described is merely sufficient to hold the groundcontacting wheels in position while the shifting of the position of the yoke 30 relative to the coller 50 occurs whereupon, when the collar 50 is in driving position, abutting on either end 32 or the end 34 of the yoke 30, as the case may be, braking is released so that there is no interference with either the rearward or forward progress of the tuck 10 and the trailing vehicle 14.

In the alternative form of construction illustrated in FIGS. 4 and 6 of the drawings, a fluid system of shifting the positions of the axle assembly of the wheel assembly 20 relative to the axis of the king pin 22 is utilized. In this alternative form, a fluid cylinder 200 is mounted externally on the end 34 of the yoke 30. The cylinder 200 has an open forward end 202 and a closed rear end 203. A port 204 is disposed adjacent the forward end 202, and a second port 205 is disposed adjacent the rear end 203. A conduit 206 provides fluid passage between the cylinder 200 and a spring-offset, four-way control valve 210 by way of the port 204, and a second conduit 207 also provides fluid passage between the cylinder 200 and the valve 210 by way of the port 205. A third conduit 208 provides fluid passage between the valve 210 and an air or oil supply (not shown), and a fourth conduit 209 provides fluid passage between the valve 210 and an air exhaust or an oil reservoir (not shown).

A mechanical interlock 212 is provided between the valve 210 and a gear shift lever 214 of the truck 10.

A piston 220 is slidably disposed in the cylinder 200. In place of the rod 36 in the first form of the invention, a piston rod 222 is provided. The piston rod 222 is mounted on the piston 220 and extends through the open end 202 of the cylinder 200 and through aligned bores in the ends 34 and 32 of the yoke 30, in which said aligned bores the piston rod 222 is slidably disposed.

In lieu of the collar 50 and the switch 54 mounted thereon, a collar 250 is firmly mounted on the piston rod 222 intermediate the ends 32 and 34 of the yoke 30. This mounting may be by screws 252. Collar 250 is positioned on the piston rod 222 so that, when the piston rod 222 and the piston 220 are disposed in the cylinder 200 with the piston 220 closely adjacent the rear end 203 of the cylinder 200, collar 250 will be abutting on the rear end 34 of the yoke 30. Like the collar 50, the collar 250 has an upwardly extending arm 254 which is mounted on the tubular axle 40 in a manner identical to the mounting of the arm 52 thereon in the first form of the invention, and the collar 250 thus supports the wheel assembly 20 in the same manner as does the collar 50 in the first form of the invention.

In the operation of the alternative form of the invention, the collar 250 and the assembly of axles 40 and 42 will be in the position illustrated in FIG. 4 of the drawings when the truck 10 is being driven forward, with the collar 250 abutting on the rear end 34 of the yoke 30, and with the assembly of axles 40 and 42 disposed rearwardly of the axis of the king pin 22. At this stage, the piston 220 will be disposed in the cylinder 200 closely adjacent the rear end 203 of the cylinder 200.

When the truck 10 and the trailing vehicle 14 are to be reversed, the gear shift lever 214 is moved into reverse gear position. The mechanical interlock 212 between the lever 214 and the control valve 210 operates the control valve 210 to open the conduit 207 to permit fluid under pressure to enter the cylinder 200 between the end 203 of the cylinder 200 and the piston 220, forcing the piston 220 toward the open end 202 of the cylinder 200 and extending the piston rod 222. The collar 250, mounted on the piston rod 222 and the assembly of the axles 40 and 42 supported thereon will then be moved to the left until the collar 250 abuts on the forward end 32 of the yoke 30, whereupon the assembly of the axles 40 and 42 will be disposed forwardly of the axis of the king pin 22 and will be maintained in that position by the rearward movement of the truck 10 and the trailing vehicle 14.

If the truck 10 and the trailing vehicle 14 are then to move forward, the gear shift lever 214 is moved into forward drive position. The mechanical interlock 212 between the lever 214 and the control valve 210 then operates the control valve 210 to open the conduit 206 to permit fluid under pressure to enter the cylinder 200 between the forward end 202 of the cylinder 200 and the piston 220, forcing the piston 220 toward the rear end 203 of the cylinder 200 and retracting the piston rod 222. The collar 250 and the assembly of the axles 40 and 42 supported thereon will then be moved to the right until the collar 250 abuts on the rear end 34 of the yoke 30, whereupon the assembly of the axles 40 and 42 will be disposed rearwardly of the axis of the king pin 22 and will be maintained in that position by the forward movement of the truck 10 and the trailing vehicle 14.

In the alternative form of axle assembly illustrated in FIG. 7 of the drawings, in lieu of providing the full-floating axle 42 shown in FIG. 2 of the drawings, an axle 300 is utilized. The axle 300 is disposed within a hollow tubular axle 302, and bearings 304 are interposed between the axle 300 and the tubular axle 302. The ends of the axle 300 protrude beyond the ends of the tubular axle 302, and wheel hub caps 306 are firmly mounted on the protruding ends of the axle 300 by any suitable means. The caps 306 are in turn mounted on the wheel hub assemblies 308 which, in the alternative form of the invention, are spaced apart from the tubular axle 302 and are free to rotate free of the tubular axle 302.

Although the invention has been herein shown and described in what are conceived to be the most practical and preferred embodiments thereof, it is recognized that departures may be made therefrom within the scope of the invention, which is not to be limited to the details disclosed herein, but is to be accorded the full scope of the claims so as to embrace any and all equivalent structures and devices.

We claim:

1. A vehicular ground-contacting wheel assembly which comprises: a vertically disposed strut mounted on the vehicle and depending therefrom; a yoke having a body section and downwardly directed end sections, the yoke being mounted on the lower end of the strut at substantially the center of the body section; a transverse rod interconnecting the end sections of the yoke and spaced apart from the body section; a collar slidably disposed on the rod; an axle mounted on the collar and disposed between the body section of the yoke and the rod in transverse relation to the rod so that, upon slidable movement of the rod and the collar relative to each other, the collar will abut on one of the end sections of the yoke, and the axle will be disposed laterally of the vertical axis of the strut; wheel hub assemblies mounted on the axle; ground-contacting wheels mounted on the wheel hub assemblies; fluid pressure brakes mounted on the wheel hub assemblies; a source of fluid under pressure; a fluid passage between said source and said brakes; and control means mounted on said passage for supplying fluid under pressure to said brakes to brake the wheels when slidable movement of the rod and the collar relative to each other is to be accomplished and to automatically release the braking action on the wheels when said slidable movement has been completed.

2. A vehicular ground-contacting wheel assembly which comprises: a vertically disposed strut mounted on the vehicle and depending therefrom; a yoke having a body section and downwardly directed end sections, the yoke being mounted on the lower end of the strut at substantially the center of the body section; a transverse rod interconnecting the end sections of the yoke and spaced apart from the body section; a collar slidably disposed on the rod; an axle mounted on the collar and disposed between the body section of the yoke and the rod in transverse relation to the rod so that, upon slidable movement of the rod and the collar relative to each other, the collar will abut on one of the end sections of the yoke, and the axle will be disposed laterally of the vertical axis of the strut; wheel hub assemblies mounted on the axle; ground-contacting wheels mounted on the wheel hub assemblies; fluid pressure brakes mounted on the wheel hub assemblies; a source of fluid under pressure; a cylindrical slide valve body; a first fluid pressure conduit leading from the source of fluid under pressure to one end of the slide valve body; a second fluid pressure exhaust conduit mounted on the slide valve body; a third fluid pressure conduit mounted on the slide valve body intermediate the first and second conduits and leading to the brakes; a piston disposed in the slide valve body for slidable reciprocal movement therein; piston rods mounted on opposite sides of the piston and protruding from the slide valve body; a first solenoid mounted on the protruding end of one of the piston rods; a second solenoid mounted on the protruding end of the other piston rod; a source of electric energy connected to the first solenoid and to the second solenoid; a first switch interposed between the source of electric energy and the first solenoid to energize the first solenoid when the first switch is momentarily closed so as to move the piston in one direction in the slide valve body to open fluid pressure communication between the source of fluid under pressure and the brakes and to close the pressure exhaust conduit so as to apply braking action on the wheels; a second switch mounted on the collar and interposed between the source of electric energy and the second solenoid; and control means mounted on the second switch and disposed so as to be activated when the collar abuts on the ends of the yoke to momentarily close the second switch and energize the second solenoid to move the piston in the opposite direction in the slide valve to close fluid pressure communication between the source of fluid under pressure and the brakes and open fluid communication between the brakes and the pressure exhaust conduit so as to release braking action on the wheels.

3. A vehicular ground-contacting wheel assembly as defined in claim 2, including: a gear shift lever mounted on the vehicle; and a mechanical interlock interconnecting the gear shift lever and the first switch so as to close the first switch momentarily upon shifting of the gear shift lever selectively between rear drive position and forward drive position.

4. A vehicular ground-contacting wheel assembly which comprises: a vertically disposed strut mounted on the vehicle and depending therefrom; a yoke having a body section and downwardly directed end sections, the yoke being mounted on the lower end of the strut at substantially the center of the body section; a transverse rod interconnecting the end sections of the yoke and spaced apart from the body section; a collar slidably disposed on the rod; an axle mounted on the collar and disposed between the body section of the yoke and the rod in transverse relation to the rod so that, upon slidable movement of the rod and the collar relative to each other, the collar will abut on one of the end sections of the yoke, and the axle will be disposed laterally of the vertical axis of the strut; means for imparting slidable movement to the rod and the collar relative to each other so as to selectively dispose the axle on alternate sides of the vertical axis of the strut; wheel hub assemblies mounted on the axle; ground-contacting wheels mounted on the wheel hub assemblies; fluid pressure brakes mounted on the wheel hub assemblies; a source of fluid under pressure; a cylindrical slide valve body; a first fluid pressure conduit leading from the source of fluid under pressure to one end of the slide valve body; a second fluid pressure exhaust conduit mounted on the slide valve body; a third fluid pressure conduit mounted on the slide valve body intermediate the first and second conduits and leading to the brakes; a piston disposed in the slide valve body for slidable reciprocal movement therein; piston rods mounted on opposite sides of the piston and protruding from the slide valve body; a first solenoid mounted on the protruding end of one of the piston rods; a second solenoid mounted on the protruding end of the other piston rod; a source of electric energy connected to the first solenoid and to the second solenoid; a first switch interposed between the source of electric energy and the first solenoid to energize the first solenoid when the first switch is momentarily closed so as to move the piston in one direction in the slide valve body to open fluid pressure communication between the source of fluid under pressure and the brakes and to close the pressure exhaust conduit so as to apply braking action on the wheels; a second switch mounted on the collar and interposed between the source of electric energy and the second solenoid; and control means mounted on the second switch and disposed so as to be activated when the collar abuts on the ends of the yoke to momentarily close the second switch and energize the second solenoid to move the piston in the opposite direction in the slide valve to close fluid pressure communication between the source of fluid under pressure and the brakes and open fluid communication between the brakes and the pressure exhaust conduit so as to release braking action on the wheels.

5. A vehicular ground-contacting wheel assembly as defined in claim 4, including: a gear shift lever mounted on the vehicle; and a mechanical interlock interconnecting the gear shift lever and the first switch so as to close the first switch momentarily upon shifting of the gear shift lever selectively between rear drive position and forward drive position.

6. A vehicular ground-contacting wheel assembly which comprises: a vertically disposed strut mounted on the vehicle and depending therefrom; a yoke having a body section and downwardly directed end sections, the yoke being mounted on the lower end of the strut at substantially the center of the body section; a transverse rod slidably disposed in aligned bores in the end sections of the yoke and having a protruding end, the rod being spaced apart from the body section; a collar mounted on the rod intermediate the end sections of the yoke; an axle mounted on the collar and disposed between the body section of the yoke and the rod in transverse relation to the rod so that, upon slidable movement of the rod, the collar will abut on one of the end sections of the yoke, and the axle will be disposed laterally of the vertical axis of the strut; a fluid pressure cylinder disposed so as to receive the protruding end of the rod; a piston mounted on the rod and disposed in the cylinder for slidable reciprocal movement therein; first fluid access means adjacent one end of the cylinder for entry of fluid pressure to move the piston and the rod in one direction; second fluid access means adjacent the other end of the cylinder for entry of fluid pressure to move the piston and the rod in the opposite direction; a control valve straddling the first fluid access means and the second fluid access means and operable to selectively introduce fluid under pressure into the first fluid access means or the second fluid access means; a gear shift lever mounted on the vehicle; and a mechanical interlock interconnecting the gear shift lever and the control valve so as to operate the control valve to introduce fluid under pressure into the first fluid access means when the gear shift lever is moved to one drive position and to introduce fluid under pressure into the second fluid access means when the gear shift lever is moved to the opposite drive position.

References Cited by the Examiner
UNITED STATES PATENTS

| | | | |
|---|---|---|---|
| 2,016,468 | 10/35 | Wagner | 280—43.23 |
| 2,053,447 | 9/36 | Sargent | 280—81 |
| 2,559,935 | 7/51 | Brown | 280—80 |
| 2,674,464 | 4/54 | Peterson | 280—80 |
| 2,693,393 | 11/54 | Heth | 301—1 |
| 2,847,228 | 8/58 | Hall | 280—81 |
| 2,858,163 | 10/58 | Nagel | 301—1 |
| 2,919,928 | 1/60 | Hoffer | 280—81 |
| 2,974,976 | 3/61 | Lyall | 280—124 |
| 3,051,506 | 8/62 | Stump et al. | 280—81 |
| 3,112,100 | 11/63 | Prichard | 259—172 |

A. HARRY LEVY, *Primary Examiner.*

KENNETH H. BETTS, *Examiner.*